Figure 1:
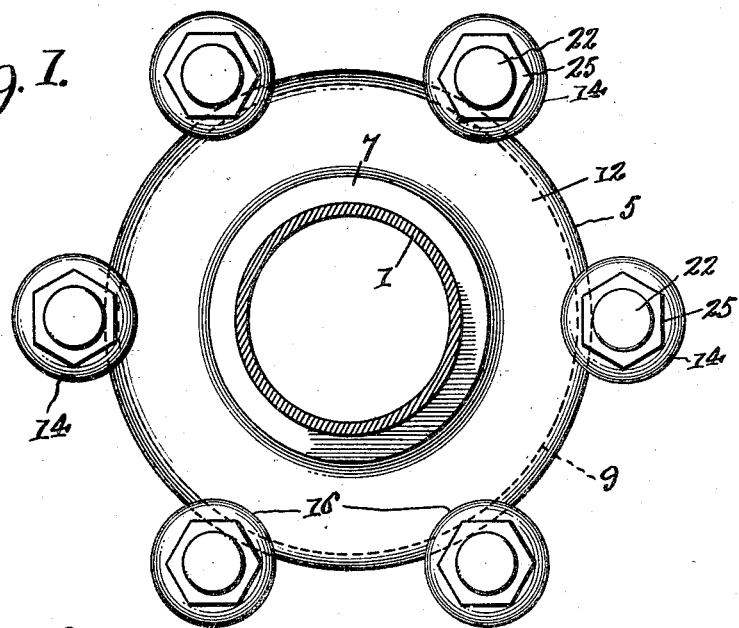

Nov. 11, 1924. 1,514,803

D. SOUTER ET AL

FLANGE PIPE COUPLING

Filed Feb. 3, 1921

Inventors
D. Souter and
W. Z. Wilkinson
by Wilkinson & Giusta
Attorneys

Patented Nov. 11, 1924.

1,514,803

UNITED STATES PATENT OFFICE.

DRACOS SOUTER AND WILLIAM Z. WILKINSON, OF BATON ROUGE, LOUISIANA.

FLANGE PIPE COUPLING.

Application filed February 3, 1921. Serial No. 442,210.

*To all whom it may concern:*

Be it known that we, DRACOS SOUTER and WILLIAM Z. WILKINSON, citizens of the United States, residing at Baton Rouge, in the parish of East Baton Rouge and State of Louisiana, have invented certain new and useful Improvements in Flange Pipe Couplings; and we do hereby declare the following to be a full, clear, and exact description of the invention, such as will enable others skilled in the art to which it appertains to make and use the same.

The present invention relates to improvements in flange pipe couplings and it more particularly relates to a type of pipe coupling in which the flanges are left unperforated and are secured together by the use of bolts that lie exteriorly of the flanges to the end that the gasket may be left imperforate, and for this reason stronger and less likely to be disrupted or blown out by heavy pressure within the pipe.

The invention is an improvement over those pipe flange couplings in which the bolts go directly through the flanges and through perforations made in the gasket.

Another object of the invention resides in providing a simple and economical construction of bolts and clamps acting in conjunction with peculiarly formed pipe flanges.

A further object of the invention resides in providing a quick detachable and removable flange pipe coupling in which the two flanges need not necessarily be brought together in a certain relation, as required when bolt holes or perforations must be made to aline, but according to my invention, the exterior bolts and their clamps are attachable to the flanges in whatsoever angular position these flanges may accidentally assume when brought together.

A still further object of the invention resides in providing a flange pipe coupling with exterior clamping devices which have the beneficial result of securing better and tighter coupling, while at the same time providing flanges of smaller diameter than heretofore generally used.

With the foregoing and other objects in view, the invention will be more fully described hereinafter, and will be more particularly pointed out in the claim appended hereto.

In the drawings, wherein like symbols refer to like or corresponding parts throughout the several views.

Figure 2:
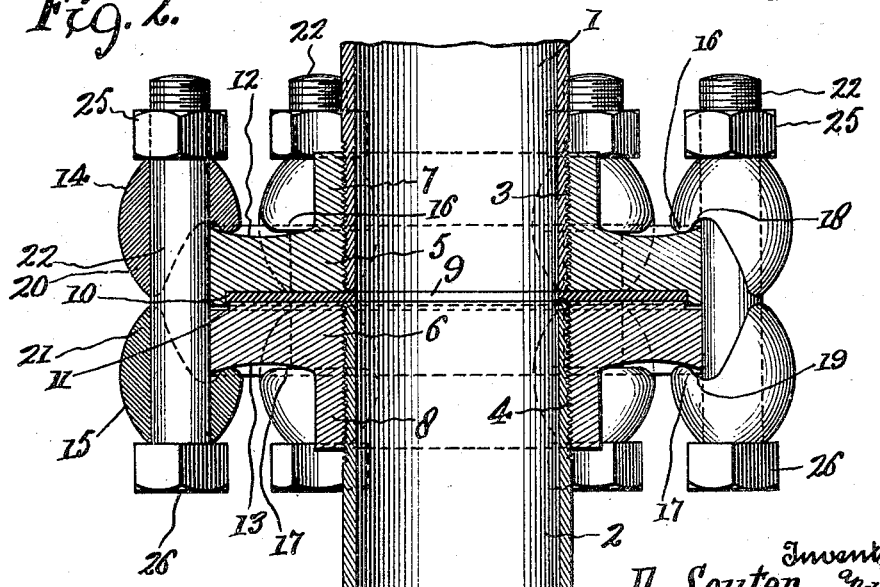

Fig. 1 is a top plan view, with one of the pipes shown in section, of an improved flange pipe coupling constructed according to the present invention; and Fig. 2 is a vertical sectional view therethrough with the two pipes broken away.

Referring more particularly to the drawings, 1 and 2 designate adjoining ends of two pipes which are to be coupled together. These pipes are threaded respectively as indicated at 3 and 4 in order to receive the flanges 5 and 6, which are internally threaded to engage with the threads 3 and 4.

The flanges 5 and 6 have shoulders 7 and 8 projecting therefrom and provided with threads so as to form an extended bearing for the flanges along the pipe section. A gasket 9 is received between the two flanges 5 and 6 and both the flanges and the gasket are left without bolt holes or perforations and in general, these parts are entirely imperforate so that they form a compact, uniform and uninterrupted joint of a high leak-proof quality resisting great pressures from within the pipes 1 and 2.

The flange 5 is provided with a shoulder 10 directed toward the companion flange 6 and received in a groove 11 made in this latter flange for this purpose. The shoulder 10 forms a radial abutment for the outer free edge of the gasket 9 and prevents its radial expansion when subjected to pressure from within the pipe, or compression due to the binding together of the flanges 5 and 6. In other words, the flanges, together with the shoulder 10, form a substantially closed chamber in which the gasket 9 is seated.

The gasket is preferably of a compressible character in order to yield when the two flanges 5 and 6 are drawn together thereon.

According to the invention, the flanges 5 and 6 are further made with curved outer faces 12 and 13. The arc on which this curvature is struck need not be of any specific variety, but may be changed to suit various conditions, it being understood that the sharper the curvature the greater will be the binding effect of the clamps which are indicated at 14 and 15, and which are provided with noses 16 and 17 adapted to come in contact with the curved faces 12 and 13 of the flanges.

The noses 16 and 17 are rounded and provided with clearance spaces 18 and 19 for the purpose of receiving the peripheral edge portions of the curved walls 12 and 13 of the flanges. Opposite the noses 16 and 17 the clamps are provided with extensions 20 and 21, which project toward one another and provide large bearing surfaces upon the bolts 22 which pass through openings made in the clamps.

These extensions 20 and 21 lie opposite the noses 16 and 17 and counteract any tendency of the clamps to cant upon the bolts.

In use the device is assembled in the manner indicated in the drawing, it being understood that as many of the bolts and clamps may be used as is necessary. The number of bolts will depend largely upon the pressure to be sustained within the pipe, the character and quality of the gasket and many other considerations of usage, which will vary widely in different cases.

The clamps 14 and 15 engage the outer curved faces 5 and 6 without necessitating the provision of openings in the flanges, and without requiring the perforating or mutilation in any way of the gasket 9. The bolts lie entirely exteriorly of both the gasket and flanges and they act through the overhanging noses 16 and 17 to secure the flanges tightly together and to put the gasket under the necessary compression.

It will be understood that by virtue of the curvature given the faces 12 and 13 of the flanges and the curvature given the noses 16 and 17 of the clamps, both the clamps and the bolts will tend to ride inwardly toward the center of the pipes as the ends 25 are tightened. This will permit an interlocking engagement of the bolts and clamps with the flanges, and moreover it will exert great pressure upon the gasket 9.

Of course this will cause a great deal of pressure to devolve upon the noses 16 and 17 which will exert a tendency to cant or rock the flanges about the bolts. This tendency, however, is adequately counteracted by the extensions 20 and 21 which reinforce the opposite portions of the clamps and prevent any tendency of the same to move or become otherwise distorted or injured. These extensions distribute the stresses and strains set up in the material over an increased area of the bolt and therefor compensate for the forces acting upon the noses.

The clamps, together with the bolts and nuts, form a unit in themselves which may be purchased in any suitable quantities, while the flanges also are readily attachable and detachable from the usual threaded pipe sections so that they may form standard parts to be bought cheaply and interchanged readily.

We do not wish to be restricted to the size, form and proportions of the various parts, and obviously changes could be made in the construction herein described without departing from the spirit of the invention, it being only necessary that such changes fall within the scope of the appended claim.

What is claimed is:—

A detachable pipe coupling comprising a pair of flanges attached to adjacent ends of two sections of pipe to be joined together, a gasket placed and compressed between the adjacent faces of said flanges, the remote faces of the flanges being curved radially, and a number of clamps placed at intervals about the circumferential edges of said flanges, each of said clamps comprising two substantially spherical members having rounded noses adapted to come into contact with the curved remote faces of said flanges, said clamp members having registering openings therethrough, a bolt made separate from said two clamp members and freely fitted through the registering openings therein for drawing the clamp members together upon said flanges and for causing the rounded noses to ride radially inward upon the curved remote faces of said flanges, said clamp members having clearance spaces extending inwardly of the noses and further provided with extensions opposite the noses and being considerably longer than said noses, said extensions of the two clamp members approaching close to one another at the outer sides of the bolt and extending laterally of the bolt, the opening through said clamp members adapted to snugly fit the bolt.

DRACOS SOUTER.
WILLIAM Z. WILKINSON.